May 17, 1960 O. B. SHERMAN 2,936,489
METHOD FOR MAKING COMPOSITE PLASTIC CONTAINERS
Filed May 22, 1957 4 Sheets-Sheet 1
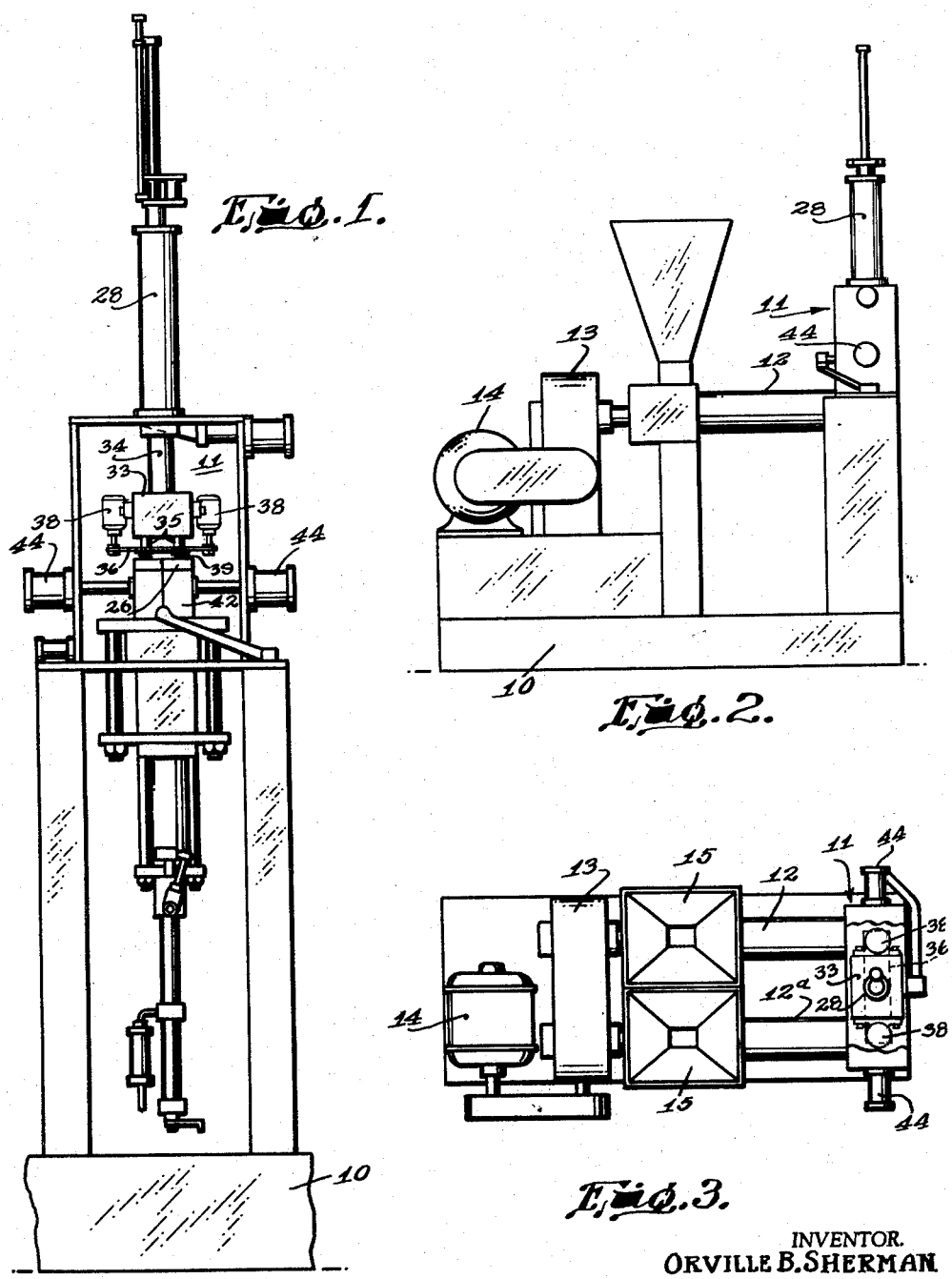
INVENTOR.
ORVILLE B. SHERMAN
BY
ATTORNEYS

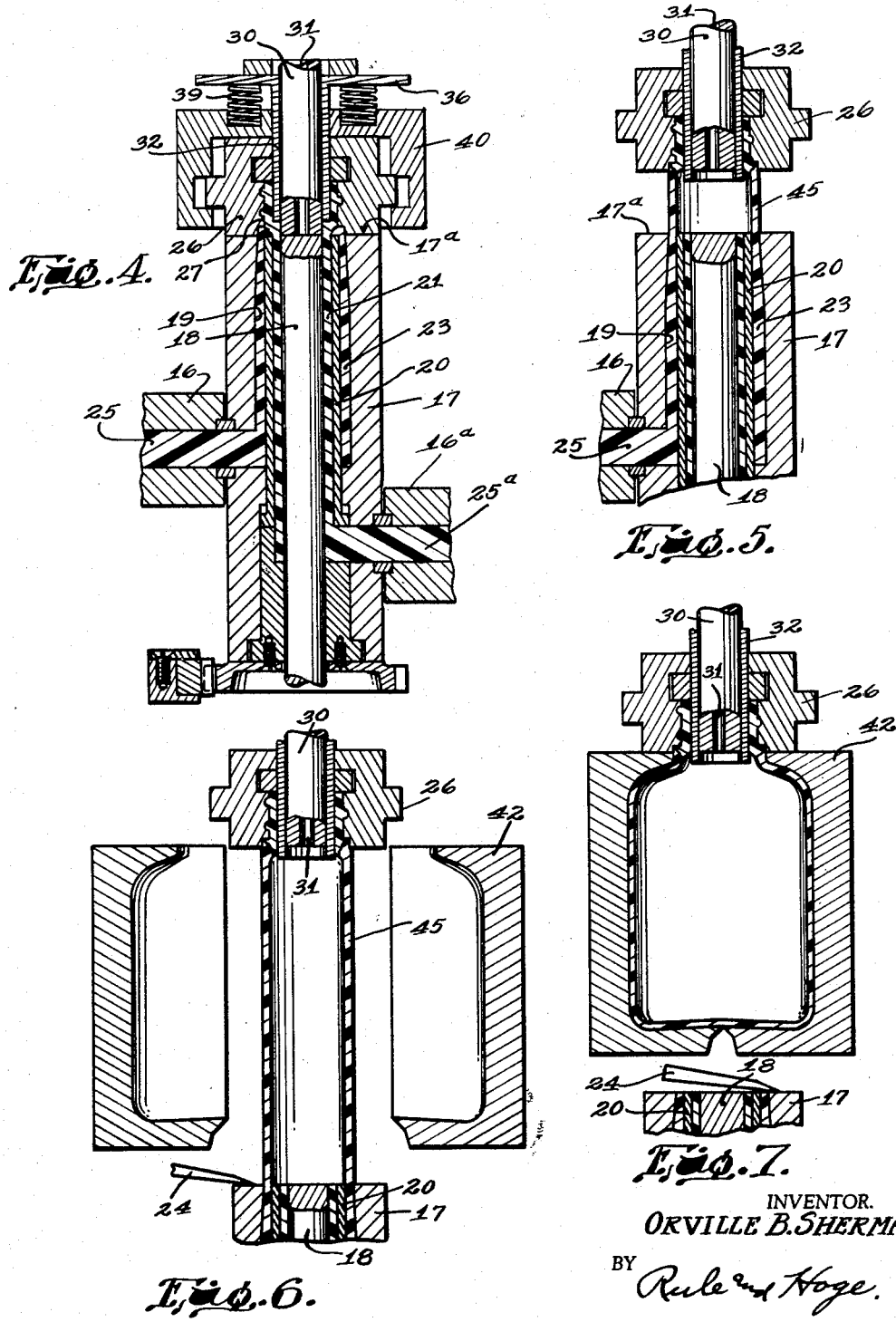

May 17, 1960  O. B. SHERMAN  2,936,489
METHOD FOR MAKING COMPOSITE PLASTIC CONTAINERS
Filed May 22, 1957  4 Sheets-Sheet 3
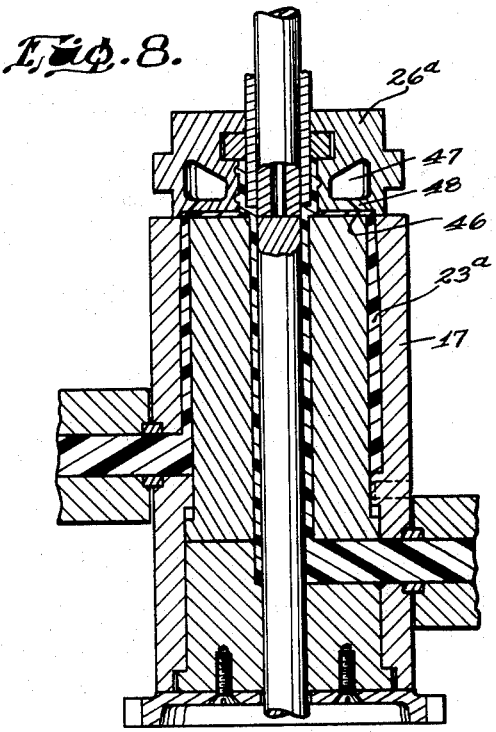
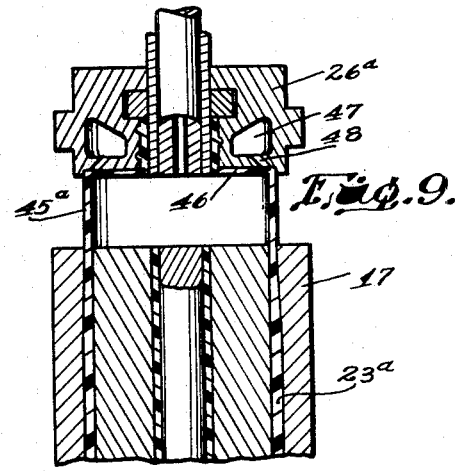
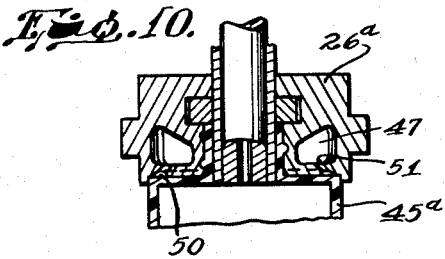
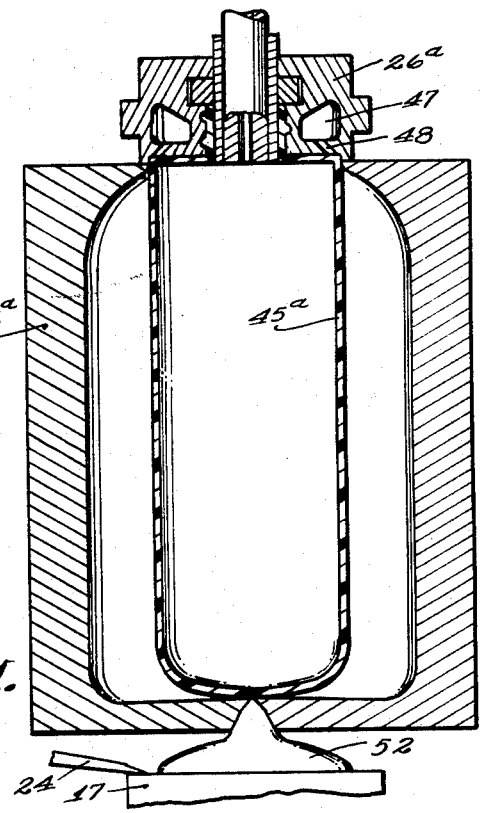
INVENTOR.
ORVILLE B. SHERMAN
BY Rule and Hoge.
ATTORNEYS

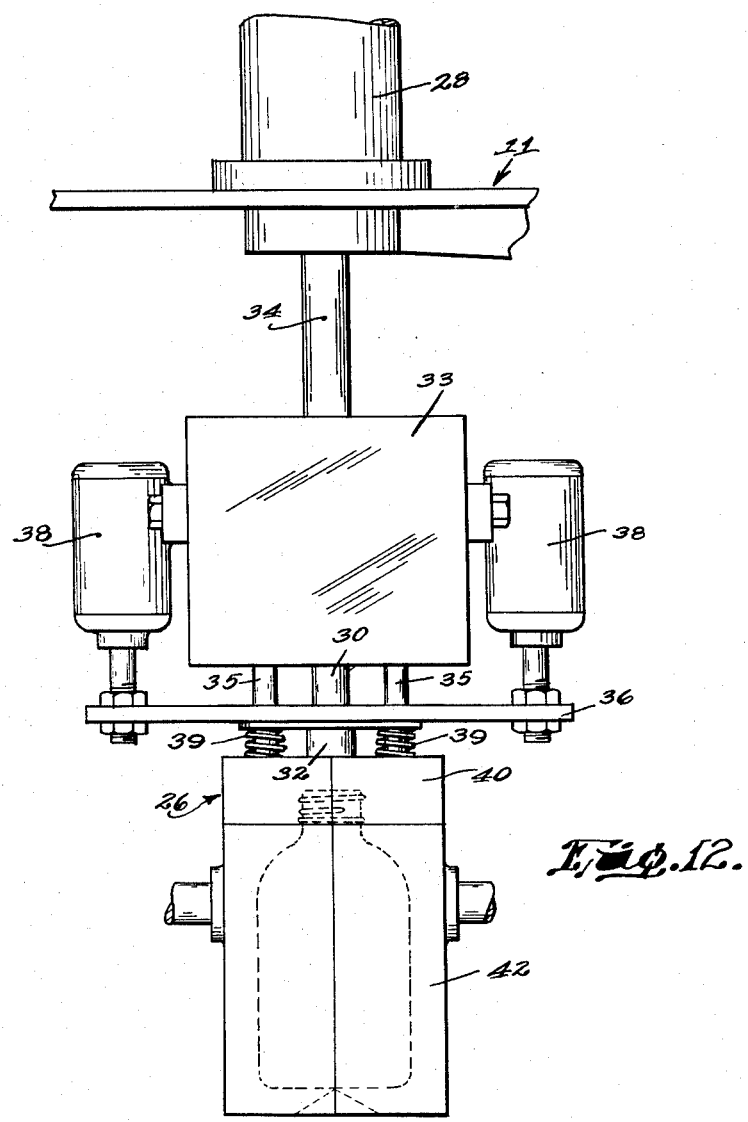

United States Patent Office 2,936,489
Patented May 17, 1960

2,936,489

METHOD FOR MAKING COMPOSITE PLASTIC CONTAINERS

Orville B. Sherman, Toledo, Ohio, assignor to Owens-Illinois Glass Company, a corporation of Ohio Application May 22, 1957, Serial No. 660,888

10 Claims. (Cl. 18—55)

My invention relates to the manufacture of containers or other articles made of plastic materials. The invention provides a method and apparatus by which composite articles may be made from plastic materials, the component parts of the article formed of separate plastics having different characteristics, the parts being welded together during the formation of the articles. More particularly the invention provides a method and means for forming a container such as a bottle having a hollow body and a neck portion, the body portion being formed of one plastic and the neck comprising a different plastic.

An object of the invention is to provide a method of making composite articles such as bottles having a body portion consisting of a plastic of desired characteristics and a neck and finish made of a separate plastic of different properties desirable for such part. The invention may be used, for example, in making bottles of polyethylene in which the body portion consists of a low pressure polyethylene which can be molded or blown to form the body portion with comparatively thin, hard walls providing a light weight article, the neck portion and finish of the bottle being made of a high pressure polyethylene. The low pressure polyethylene which is comparatively hard lacks elasticity or stretchability so that it may fail when subjected to strain, for example by internal pressure developed by a product packaged within the bottle. By making the neck portion, or neck and shoulder portion, of high pressure polyethylene which is comparatively soft and stretchable, this difficulty is overcome, the softer polyethylene also adapting itself to the closure caps by which the bottle is closed or sealed. Further, the neck and finish will not crack, crizzle or craze when subjected to rubbing or torque by a closure cap or other means.

Other objects of the invention will appear hereinafter.

Referring to the accompanying drawings:

Fig. 1 is a front elevation of an apparatus which may be used in making bottles or other containers;

Fig. 2 is a side elevation of the same on a smaller scale;

Fig. 3 is a top plan view;

Fig. 4 is a sectional elevation showing means providing concentric tubular channels into which the plastics are extruded and the neck mold in register therewith;

Fig. 5 is a view similar to Fig. 4 showing the neck mold being withdrawn upwardly;

Fig. 6 is a view showing the neck mold in its upper position and the open finishing mold;

Fig. 7 is a similar view showing the finishing mold closed and the bottle blown to finished form;

Fig. 8 is a view similar to Fig. 4 showing a modified construction for making a narrow neck bottle, the body of the bottle being of comparatively large diameter;

Fig. 9, similar to Fig. 8, shows the neck mold withdrawn upwardly to an intermediate position;

Fig. 10 is a sectional view showing a modified form of neck mold;

Fig. 11 is a sectional elevation showing the finishing mold closed around the tubular body formed in the Fig. 8 structure; and Fig. 12 is an elevation of parts shown in Fig. 1, particularly the means for operating the shearing devices.

Referring to Figs. 1, 2, and 3 the article forming apparatus 11 is mounted on a base 10. The plastic materials are fed through hoppers 15 to the extruders 12 and 12a. The extruders are driven by a motor 14 operating through mechanism in a gear box 13.

The apparatus shown in Figs. 1, 2 and 3 is similar to that disclosed in the copending application of Mumford et al., Ser. No. 403,594, filed January 12, 1954, Apparatus for Forming Hollow Plastic Articles.

Referring to Figs. 4 to 7, the extruders comprise nozzles 16 and 16a through which the plastics in a moldable plastic condition are extruded into tubular cavities formed within a tubular column 17. A cylindrical rod 18 concentric with the cylindrical bore 19 of the column 17, extends upwardly through said column. The upper end of the rod 18 is at the same level as the upper end 17a of the column 17. A cylindrical tube 20 is mounted within the bore 19 of column 17, concentric with the rod 18 and forming therewith an inner tubular space or channel 21 into which plastic material is fed from the nozzle 16a to form an inner plastic tube as presently described. An outer tubular channel 23 is formed between the tube 20 and the inner wall surface of the column 17. Concentric tubular cavities are thus formed, the tube 20 serving as a separating wall between the cavities. Plastic material 25, which may be a low-pressure polyethylene, is extruded through the nozzle 16 into the outer channel 23. Plastic material 25a which may be a high-pressure polyethylene is extruded from the nozzle 16a into the inner tubular channel 21.

The neck mold 26 comprises partible sections and is mounted over the column 17 for up-and-down movement by a cylinder 28 (Figs. 1 and 2). The neck mold when in its lowered position seats on the column 17. The neck mold cavity 27 as shown in Fig. 4 forms an extension of the inner channel 21. The outer channel 23 also merges into the neck mold cavity about the tubular wall 20. The upper end of the wall 20 is at the same level or plane as the upper end of the column 17 and rod 18. A vertical rod 30, concentric with the rod 18 and of the same diameter, is formed with a central bore 31 through which air under pressure is supplied for blowing the article in the finishing mold, as hereinafter described. A sleeve 32 surrounds the rod 31 and is movable up and down with and also relative to the neck mold. This sleeve forms the inner wall surface of the neck mold cavity. When the sleeve is moved downward it operates as a shear, the lower end of the sleeve cooperating with the tube 20 to sever the plastic material in the neck mold cavity from the inner plastic tube in the channel 21.

Operating connections between the cylinder 28 and the neck mold sections 26 for lifting and lowering the latter include a head 33 (Figs. 1 and 12) connected to the piston 34 of the cylinder, and rods 35 connecting the head 33 to a yoke 40 which carries the neck mold. The sleeve 32 is attached to or formed integral with a plate 36. The sleeve 32 is moved downward for shearing the plastic by piston motors 38 (Fig. 12) having pistons connected to the plate 36. The sleeve 32 is normally held in its lifted position by coil compression springs 39 between the plate 36 and the yoke 40. The neck mold sections are movable laterally for opening and closing the molds by means comprising inclined rods for camming mold sections, as set forth, for example, in the above identified application of Mumford et al.

A finishing mold 42 comprises partible mold sections movable horizontally from the open position in Fig. 6 to the closed position, Fig. 7. The mold sections are operated by piston motors 44, Fig. 1.

The operation is as follows: With the parts in the position shown in Fig. 4, plastic material 25a is extruded from the nozzle 16ª into the inner tubular channel 23. The material is propagated or flows upwardly through the channel and into the neck mold cavity, thereby molding the neck of the articles and forming an integral tube of the plastic material extending downward from the neck. Plastic 25 is extruded through nozzle 16 into the outer channel 23, thereby forming a tube of the plastic material which is propagated upwardly until it merges into the plastic within the neck mold cavity, substantially at the base of the neck mold or where the molded neck merges into the plastic in the inner channel 21.

The injection of the plastic 25 into the outer tubular channel is timed to permit the plastic 25ª from the inner channel to form the neck of the article before the outer plastic can enter the neck mold cavity, the pressure applied to the extruding plastic being sufficient to form a perfect weld where the two plastics meet. After the material has entered the neck mold cavity the sleeve 32 is lowered to shear the plastic at the line of contact between the tube 21 and sleeve 32, thereby severing the molded neck from its source of supply. The extrusion of the material to form the outer tube may be timed if desired, to bring the material 25 into contact with the molded neck after the shearing sleeve 32 has been lowered. After the neck of the article has been molded and welded to the outer tube of plastic, the neck mold is withdrawn upwardly by its motor 28, away from the column 17. At the same time extrusion of the plastic 25 into the outer tubular channel 23 is continued so that a cylindrical body or tube 45 integral with the molded neck is drawn upwardly from the column 17. When the neck mold has reached the upper limit of its movement (Fig. 6) a blade 24 is moved across the upper end of the column 17, thereby shearing the tube 45. The finishing mold sections 42 are then brought together and operate to close the lower end of the tube 45. Air under pressure is then applied through the tube 30 and expands the tube 45, thereby molding the article to its finished form.

With a low pressure polyethylene 25 and the high pressure polyethylene 25ª, the operation above described results in a polyethylene bottle having a body consisting of thin walls of comparatively hard, low pressure polyethylene and an integral neck of comparatively soft, high-pressure polyethylene. Other plastics adapted for making bottles or similar articles may be used. The above described apparatus may also be used for making ware consisting of only one plastic, by supplying the same plastic material through both of the injection nozzles 16 and 16ª.

Figs. 8 to 11 illustrate a modified form of apparatus particularly adapted for forming narrow neck bottles or containers with bodies which are of materially greater diameter than the necks and also where it may be desired to form the body with comparatively thick walls. In this form the column 17 may be of comparatively large diameter and the outer tubular channel 23ª of much greater diameter than the inner tubular channel. The lower surfaces of the neck mold sections 26ª are recessed to provide a molding cavity 46 for a portion of the plastic which forms the shoulder portion of the finished article. This shoulder portion may be formed of either the hard plastic 25 or the soft plastic 25ª, depending on the timing of the extruding and molding operations. Suction chambers 47 in the neck mold sections communicate with the spaces 46 through ducts 48. Suction applied through these ducts assists in filling the cavities 46 and also assists in holding the plastic in shape and attached to the neck mold when the latter is withdrawn upwardly from the column 17.

Fig. 10 shows a modification in which an annular groove 50 is formed in the undersurface of the neck mold. This groove is in communication with the vacuum chamber 47 through ducts 51 so that suction is applied to the tube 45ª being drawn upwardly by the neck mold. This suction is applied adjacent the periphery of the tube thus securely holding the latter to the neck mold without distortion of the tube.

As shown in Fig. 11 the finishing mold sections 42ª when brought together close the tube 45ª at its lower end and simultaneously sever it from the supply body or moil 52. The blade 24 then operates as before described to shear the moil from the plastic remaining in the column 17.

Modifications may be resorted to within the spirit and scope of my invention as defined in the claims.

I claim:

1. The method of forming a hollow article of plastic material including a neck portion and body portion, said method comprising extruding into a mold an inner tube of plastic material in a plastic moldable condition from a first supply body of the material to the finished neck portion of the article from the first body, extruding an outer tube of plastic material from a second supply body, the outer tube surrounding and being space from said inner tube and being extruded in the same direction, contacting a leading end portion of the outer tube with a portion of the inner tube spaced from the leading end of said inner tube, pressing together the contacting portions of the tubes to integrally unite the contacting portions, and severing the inner tube from the first supply body adjacent the said area of contact while continuing the extrusion of the outer tube.

2. The method defined in claim 1 said method including severing the extruded outer tube from its supply body at a distance from said neck portion, closing the severed end of the outer tube, and blowing the outer tube only to its final configuration.

3. The method of forming a hollow article comprising a neck and an integral tubular body, said method comprising extruding into a mold an inner tube of plastic material in a moldable plastic condition from a first body of the material, extruding an outer tube from a second supply body in a moldable plastic condition, with the outer tube surrounding and spaced from the inner tube, contacting one end of the outer tube with the inner tube at a line of juncture at the mold and spaced from that end of the inner tube remote from the first supply body, integrally uniting said tubes under pressure at the said line of juncture, severing the inner tube from its supply body exteriorly of the mold, ceasing the extrusion of the inner tube, and continuing the extrusion of the outer tube.

4. The method defined in claim 3 including severing the outer tube from its supply body at a position remote from said line of juncture, closing said severed end of the outer tube and thereafter expanding the outer tube only within a body mold to form the body of said article.

5. The method of forming an article of plastic material comprising a hollow body, a neck, and a shoulder portion integrally uniting said neck and body, which method comprises extruding into a neck mold plastic material from a first supply body of the material, extruding in the same direction from a second supply body a tube of plastic material, bringing one end of the tube into contact with the material filling the mold at a line of juncture at the mold, integrally uniting the material in the mold and the tube at said line of juncture, thereafter severing the material filling the mold from the first supply body adjacent the mold, continuing the extrusion of the tube, severing the tube from the second supply body, and expanding the tube only in a finishing mold.

6. The method of forming a hollow article comprising a neck consisting of a plastic material and a hollow body consisting of a different plastic material, said method comprising extruding an inner tube from a supply body of the first mentioned material for forming the neck of the article, extruding an outer tube from a separate supply body of plastic material for forming the body of said article, with the inner and outer tubes concentric and spaced apart, said tubes being extruded in the same direction, molding the advanced end of the inner tube to form the neck of the article, bringing the advanced end of the outer tube into contact with the molded neck at a line of juncture between said neck and body while said tubes are in a moldable plastic condition and thereby welding together the neck and body, severing the molded neck from its supply body at the line juncture, continuing the extrusion of the outer tube after its union with the said neck and concurrently moving the neck with the forwardly advancing outer tube, severing the outer tube from its supply body, and closing the severed end of the outer tube.

7. The method of forming an article comprising a hollow body of plastic material and an integral neck consisting of a different plastic material, which method comprises extruding plastic material from a supply body of the second mentioned material into an inner tubular channel extending outwardly from said supply body and into a neck mold cavity formed in a neck mold with the neck mold cavity forming an extension of said tubular channel, thereby forming said neck, extruding plastic material from a supply body of the first mentioned plastic material into an outer tubular channel surrounding the inner channel and extending from the supply body of said first mentioned plastic material in the same direction as said inner channel, with the said channels separated by an intermediate tubular wall and with the outer said channel merging into the neck mold cavity adjacent the line of juncture between the inner channel and mold cavity, the plastic materials in said channels being in a moldable plastic condition whereby the materials in the neck mold cavity and outer channel are welded together, severing the molded neck from its supply body adjacent to said line of juncture, continuing the said extrusion of material into the said outer channel after said severance and during said continued extrusion withdrawing the neck mold away from the said channels, thereby drawing from the outer channel the material to form said hollow body, severing the material thus withdrawn from the material remaining in the outer channel, closing the severed end of the said withdrawn material, and expanding the body portion of the article within a finishing mold.

8. A method of making a plastic article having portions formed of different plastic materials comprising extruding plastic material from a first source through a first orifice and into a mold overlying the orifice to form a finished article portion of a first plastic material, extruding a tube of different plastic material from a second source through a second orifice concentric with said first orifice, uniting the tube under pressure with the material filling the mold while the mold overlies the orifice, interrupting communication between the first orifice and the mold after said uniting step, moving the mold from both orifices, continuing the extrusion of the tube integral with the material filling the mold, and subsequently blowing the tube only to its final configuration.

9. In a method of making a plastic article, the steps of positioning a mold in communication with a first source of plastic material, filling the mold from said first source, extruding plastic material from a second source into contact with the material filling the mold, pressure welding said materials to one another, interrupting communication between said first source and said mold, moving said mold while extruding a tube joined thereto from said second source, enclosing said tube only in a blow mold, and blowing the tube to its final configuration.

10. In a method of making a plastic article, the steps of extruding a first portion of a first material from a first orifice, shaping the first portion into a finished portion of the article while maintaining said portion in communication with said first orifice, extruding a limited amount of different material from a second orifice, joining said limited amount to said finished portion, interrupting communication between said first portion and first orifice, extruding an additional amount of said different material from said second orifice, and shaping said additional amount into another finished portion of the article.

References Cited in the file of this patent

UNITED STATES PATENTS

| 2,288,454 | Hobson | June 30, 1942 |
| 2,710,987 | Sherman | June 21, 1955 |
| 2,713,369 | Strahm | July 19, 1955 |
| 2,777,164 | Strahm | Jan. 15, 1957 |
| 2,789,312 | Borer | Apr. 23, 1957 |
| 2,789,313 | Knowles | Apr. 23, 1957 |
| 2,804,654 | Sherman | Sept. 3, 1957 |